(12) United States Patent
Bruning

(10) Patent No.: US 6,483,252 B2
(45) Date of Patent: Nov. 19, 2002

(54) OPTIMAL FM FOR HF OPERATION OF HIGH INTENSITY DISCHARGE (HID) LAMPS

(75) Inventor: Gert W. Bruning, Sleepy Hollow, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 9 days.

(21) Appl. No.: 09/732,584

(22) Filed: Dec. 8, 2000

(65) Prior Publication Data

US 2002/0070684 A1 Jun. 13, 2002

(51) Int. Cl.[7] .............................................. H05B 37/00
(52) U.S. Cl. .................................. 315/209 R; 315/291
(58) Field of Search ................................. 315/224, 225, 315/291, 307, 246, 209 R, 219, 276, 308

(56) References Cited

U.S. PATENT DOCUMENTS

| | | | |
|---|---|---|---|
| 4,170,746 A | 10/1979 | Davenport | 315/246 |
| 4,373,146 A | 2/1983 | Bonazoli et al. | 315/209 R |
| 5,121,034 A | 6/1992 | Allen et al. | 315/246 |
| 5,198,727 A | 3/1993 | Allen et al. | 315/291 |
| 5,404,082 A | 4/1995 | Hernandez et al. | 315/219 |
| 5,828,184 A | * 10/1998 | Nadd | 315/209 R |
| 5,828,185 A | * 10/1998 | Fellows et al. | 315/209 R |
| 6,118,224 A | 9/2000 | Murakama et al. | 315/244 |

* cited by examiner

Primary Examiner—Don Wong
Assistant Examiner—Wilson Lee
(74) Attorney, Agent, or Firm—John Vodopia

(57) ABSTRACT

A low cost method for operating a high intensity discharge (HID) lamp including a ballast circuit. The method includes generating DC in an AC-to-DC converter, capturing any AC ripple of the DC with a buffer capacitor to generate a control signal, generating a high frequency lamp power signal from DC utilizing an HF inverter circuit and modulating the high frequency power signal utilizing the control signal to generate a frequency swept lamp power signal to drive the lamp while avoiding acoustic resonance.

17 Claims, 4 Drawing Sheets

OPTIMAL FM FOR HF OPERATION OF HIGH INTENSITY DISCHARGE (HID) LAMPS

BACKGROUND OF THE INVENTION

1. Field of the Invention

The invention relates generally to high intensity discharge (HID) lamps and ballasts, and more particularly to a very low cost (VLC) ballast which avoids the need for a separate ramp generator circuit to generate a ramp signal to modulate the average lamp power and achieve desired FM modulation for lamp stability.

2. Description of Related Art

Operation of high intensity discharge (HID) lamps, e.g., metal halide lamps, by electronic ballast results in a phenomena (problem) referred to as acoustic resonance. Acoustic resonance causes the arc within the lamp to girate, flicker, and even extinguish when a ballast circuit operates the HID lamp at frequencies greater than a few kilohertz. High frequency operation in HID lamps is most desirable but for the acoustic resonance problem.

The arc tubes employed in HID lamps are hollow tubes of alumina, quartz or hard glass shaped in various sizes with cupped or conical ends filled with gas at several different pressures, depending on the operating state of the lamp. The pressure increases within the lamp as the lamp heats up. What are referred to as "organ pipe" (acoustic) resonances can occur at different lamp operating frequencies depending on the size, shape, and pressure within the arc tube. Operation at or near a resonance point (that is, at a particular high frequency) will result in acoustic resonance, i.e., arc flicker, arc stretch, arc elongation and spiraling, and even extinguishing the arc and causing arc tube breakage.

Various attempts are known to overcome the effect of acoustic resonances at high frequency. For example, U.S. Pat. No. 4,373,146, to Bonazoli, et al., discloses a method and circuit for operating a high intensity discharge (HID) lamp in a mode which minimizes or avoids acoustic resonance inside the arc tube. To do so, Bonazoli frequency modulates a carrier waveform in the kilohertz range to provide a variable frequency AC output. By varying the frequency of the ac signal, the lamp is not driven at any particular frequency for a substantial length of time, e.g., on the order of milliseconds. This FM output is provided across the electrodes of an HID lamp to drive the lamp while minimizing or avoiding acoustic resonance.

The Bonazoli circuit, however, is not low cost. The Bonazoli circuit is reproduced in prior art FIG. 1. The Bonazoli circuit includes a DC source 2 with an output connected to an inverter 6, the inverter DC input coupled to the output of the DC source 2. A carrier waveform (square wave) generator 8 in the kHz range is included which has an output coupled into inverter 6, as well as ramp generator means 20 (a conventional ramp generating circuit) for frequency modulating the carrier waveform to provide the inverter 6 with a variable frequency signal. A starter means 4 for coupling the AC signal across the lamp electrodes 12, 14 is also included. The Bonazoli square wave generator 8 operates at a voltage-controlled frequency of at least 20 kHz modulated by the sawtooth signal generated by the ramp generator.

During operation, a ramp period could be in a range of 1 to 10 milliseconds (100–1000 Hz.) with a flyback of about microsecond. The application of the ramp voltage to the square wave generator causes the carrier waveform to be swept from 20 to 30 kHz. And as mentioned above, such a mode of operation, because of the constantly changing high frequency, avoids resonance. A problem with the Bonazoli circuit resides in the fact that Bonazoli and like apparatus and methods for dealing with the problem of acoustic resonance within HID lamps is that such a circuit must incur the cost of a ramp generator circuit to provide a ramp signal to modulate the carrier waveform (FM) to drive the lamp.

OBJECTS AND SUMMARY OF THE INVENTION

It is therefore an object of the present invention to provide a simple and eloquent circuit for driving an HID lamp, e.g., a metal halide lamp, with a frequency modulated square wave which avoids the shortcomings of the ballast circuits of the prior art.

It is another object of the invention to provide, in a VLC ballast where FM is used for feedforward control to conform to line regulation, a simple R-C circuit is utilized to couple the low frequency (100–120 Hz.) ripple derived from a buffer capacitor into the frequency control portion of the ballast circuit (e.g., to vary the frequency of a signal output by a VCO). Utilizing the inherent AC ripple signal avoids the need for a separate and additional ramp generator circuit to generate a ramp signal to frequency modulate the average lamp power signal. The invention is particularly useful in lamps having a long aspect ratio, that is, at least one (1) and preferably greater than three (3).

To that end, a first embodiment of the present invention is a very low cost (VLC) ballast for driving HID lamps. The VLC ballast comprises an AC to DC converter block which includes a buffer capacitor ($C_{BUF}$) for receiving AC from a main source of AC power and converting it to DC. The output of the AC to DC converter provides to an HF inverter and ballasting element. The AC signal component captured by the buffer capacitor is filtered by a frequency control circuit constructed and provided to a high voltage driver to modulate the carrier waveform provided by the HF inverter and ballasting element to drive the lamp. The frequency control circuit includes a capacitor in parallel with a first resistor, the parallel combination in series with a second resistor. The resulting sawtooth-like signal derived from $C_{BUF}$ (as shown in FIG. 4A) is summed with the carrier signal thereby modulating same. Since the AC is either 50 or 60 Hz, the sawtooth will have a frequency of about 100 or 120 Hz. If the carrier waveform is around 80 kHz, for example, the driver will modulate the 80 kHz carrier with the filtered "sawtooth" signal, to vary the frequency of the lamp driving signal from around 75 to around 85 kHz.

The reader must note that the frequency range of HID lamps is conditioned upon power outage of the HID. For example, the HID lamp of the first embodiment is about 39 Watts. In a case of a 70 Watt lamp, the range would vary from 45–55 kHz, and a lamp putting out about 150 Watts would sweep from about 18 to about 26 kHz. The AC component of the buffer capacitor is used to modulate the average lamp power to achieve the desired FM modulation for stable operation of the lamp, that is, unnoticeable acoustic resonance.

The present invention also includes a very low cost method for operating a high intensity discharge (HID) lamp. The method includes receiving AC and converting it to DC in an AC-to-DC converter. The DC is then provided to an HF inverter and ballasting circuit, wherein a carrier signal for driving an HID lamp is generated. A ripple from atop the DC generated in the AC-to-DC converter is captured by a buffer capacitor and provided as an input to a driver to drive the HF inverter and ballasting circuit. The sawtooth or ripple modulates the carrier frequency (lamp average power) which is provided across the HID lamp electrodes such that a swept frequency signal is generated. Hence, the lamp is driven by a frequency modulated signal which minimizes the effects of acoustic resonance on the HID lamp.

BRIEF DESCRIPTION OF THE DRAWING FIGURES

DETAILED DESCRIPTION OF THE INVENTION

The present invention uses an AC ripple to frequency modulate (FM) a lamp power signal, the FM signal used to drive a high intensity discharge (HID) lamp without problems associated with acoustic resonance. The AC ripple is derived from an AC-to-DC converter included to provide DC power to the ballast in order to generate a square wave carrier signal. The present invention presents a low cost method and circuit for solving the problem that HID lamp ballast designers have long struggled with, that is, to realize a cheap and efficient method for operating the lamps at high frequency while avoiding acoustic resonance.

In particular, the invention presents a low cost ballast circuit which derives a sawtooth-like signal to modulate the average power driving the lamp from the Ac ripple riding the DC. That is, by tapping into the AC ripple riding on the DC put out by the AC-to-DC converter, the ripple or sawtooth-like signal for modulating the AC carrier generated to drive the lamp is available without the need for a conventional sawtooth generating circuit. The resulting benefit resides in the lowered cost for the ballast circuit because it does not require the separate sawtooth generator.

Figure 1:
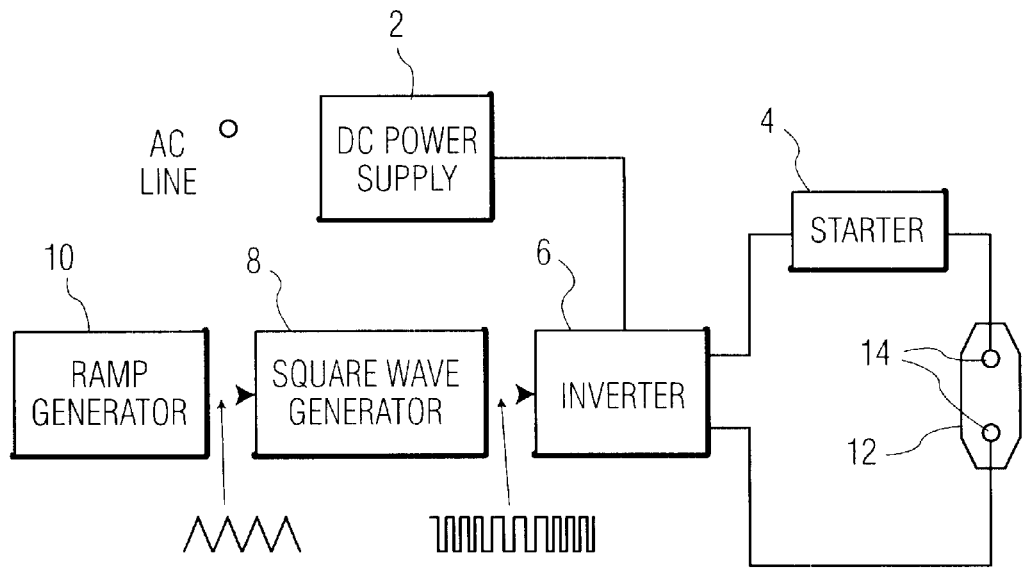
FIG. 1 is a circuit diagram of a prior art circuit for driving an HID ballast which includes a sawtooth wave generator.
Figure 2A:
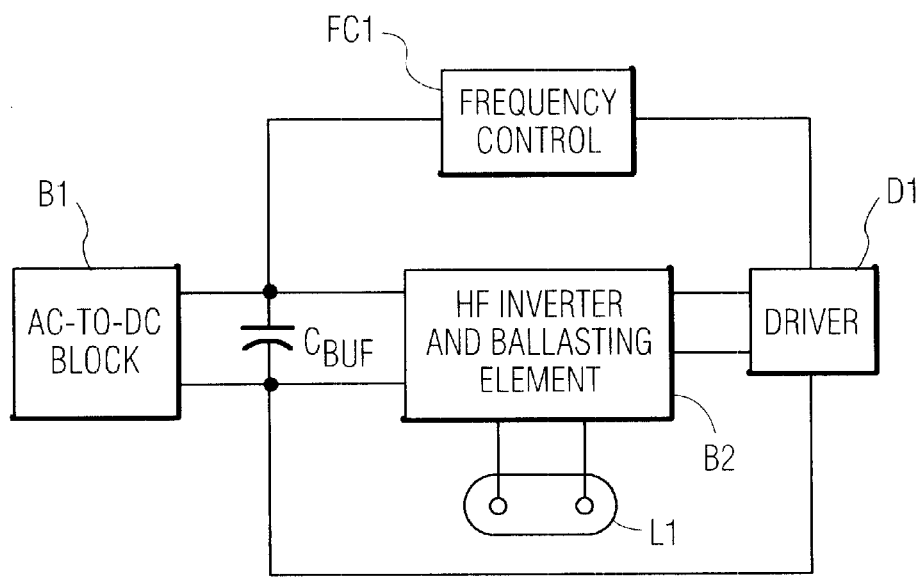
FIG. 2A is a schematic block diagram of a circuit for optimally generating FM for HF operation of HID lamps of the present invention.
Figure 4A:
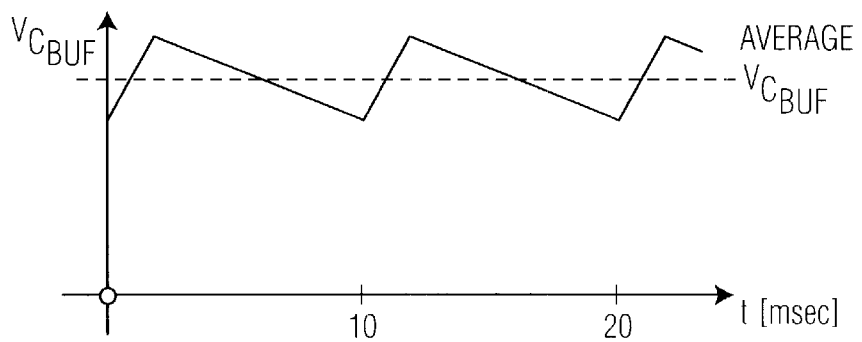
FIGS. 4A and 4B depict the variation of the voltage across the buffer capacitor over time, and the frequency variation of the current in the lamp over time, respectively.
Figure 4B:
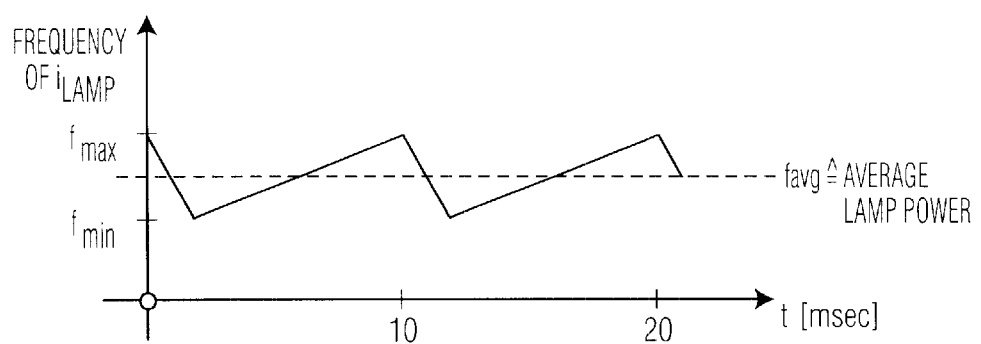

FIG. 2A shows a first embodiment of the invention comprising a ballast circuit for generating optimal FM for HF operation of HID lamps, e.g., 39 Watts. In FIG. 2A, an AC-to-DC block B1 is shown connected across a buffer capacitor, $C_{BUF}$, e.g., 22 nanofarads, to HF inverter and ballasting element B2. The HF inverter and ballasting element B2 receives DC from B1 and converts it to a square wave carrier signal to drive HID lamp L1. Driver D1 drives the HF inverter and ballasting element B2. The ripple voltage captured by the buffer capacitor is directed to a frequency control section FC1 to allow a portion of the ripple to be fed into the driver D1. Within driver D1, the AC ripple signal is utilized to frequency modulate the carrier frequency of the square wave signal. The frequency changes of the square wave output signal varies inverse proportionally to the change in voltage with time of the voltage on the buffer capacitor (as shown in FIG. 4).

Figure 2B:
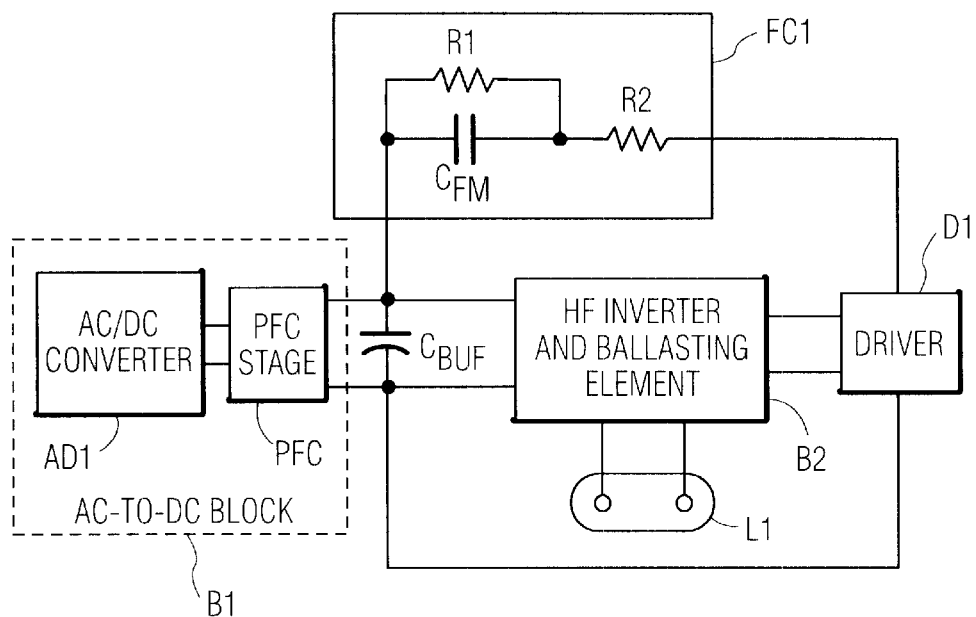
FIG. 2B is a more detailed schematic block diagram of the circuit for optimally generating FM for HF operation of HID lamps of FIG. 2A.

FIG. 2B shows the FIG. 2A embodiment where the AC-to-DC block B1 and frequency control section FC1 are further defined. More particularly, AC-to-DC block B1 includes an AC/DC converter AD1 coupled to a power factor correction (PFC) circuit, PFC. The PFC circuit provides DC to the HF inverter and ballasting element B2, and to buffer capacitor $C_{BUF}$. $C_{BUF}$ takes the ripple riding on the DC generated within the AC/DC converter AD1 and provides it to the frequency control circuit FC1.

In the present embodiment, the frequency control circuit is an RC circuit comprising a capacitor $C_{FM}$ (22 nanofarads in the first embodiment) in parallel with a first resistor R1 (around 158 kOhm in the first embodiment), the parallel combination in series with a second resistor R2 (around 169 kOhms in the first embodiment). The PFC circuit provides a signal to Driver D1 to compel it to frequency modulate the square wave signal (average lamp power) generated in the HF inverter and ballasting element B2 to drive lamp L1. In other words, the ripple on the DC is provided to the driver to vary the frequency of the average lamp power. For example, assuming an average lamp power signal operating at about 80 kHz (average for an approximately 39 Watt HID lamp, that is, the frequency is inversely related to power), i.e., the square wave generated by the HF inverter and ballasting element B2. With 60 Hz AC, the ripple is around 120 Hz and modulates the 80 kHz signal from about 75 to about 85 kHz.

Figure 2C:
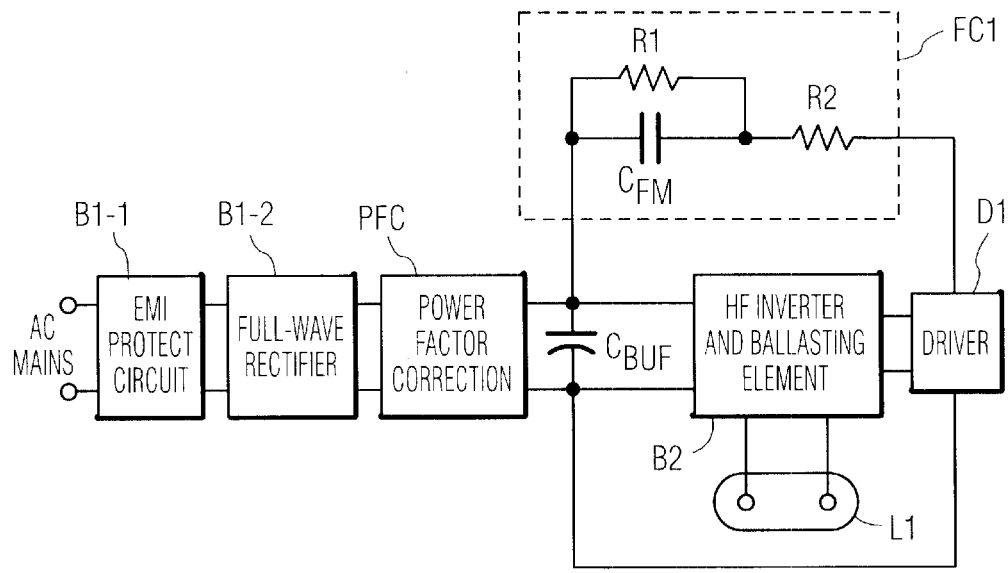
FIG. 2C is a more detailed schematic block diagram of a circuit for optimally generating FM for HF operation of HID lamps of FIG. 2B.

FIG. 2C depicts the embodiment of the invention shown in FIGS. 2A and 2B, where the AC/DC converter AD1 of AC-to-DC block B1 is further defined to include an EMI protect circuit B1-1 and a full-wave rectifier circuit B1-2. A more detailed description of the construction of an embodiment of both may be found below, operation of which is known to those skilled in the art.

Figure 3:
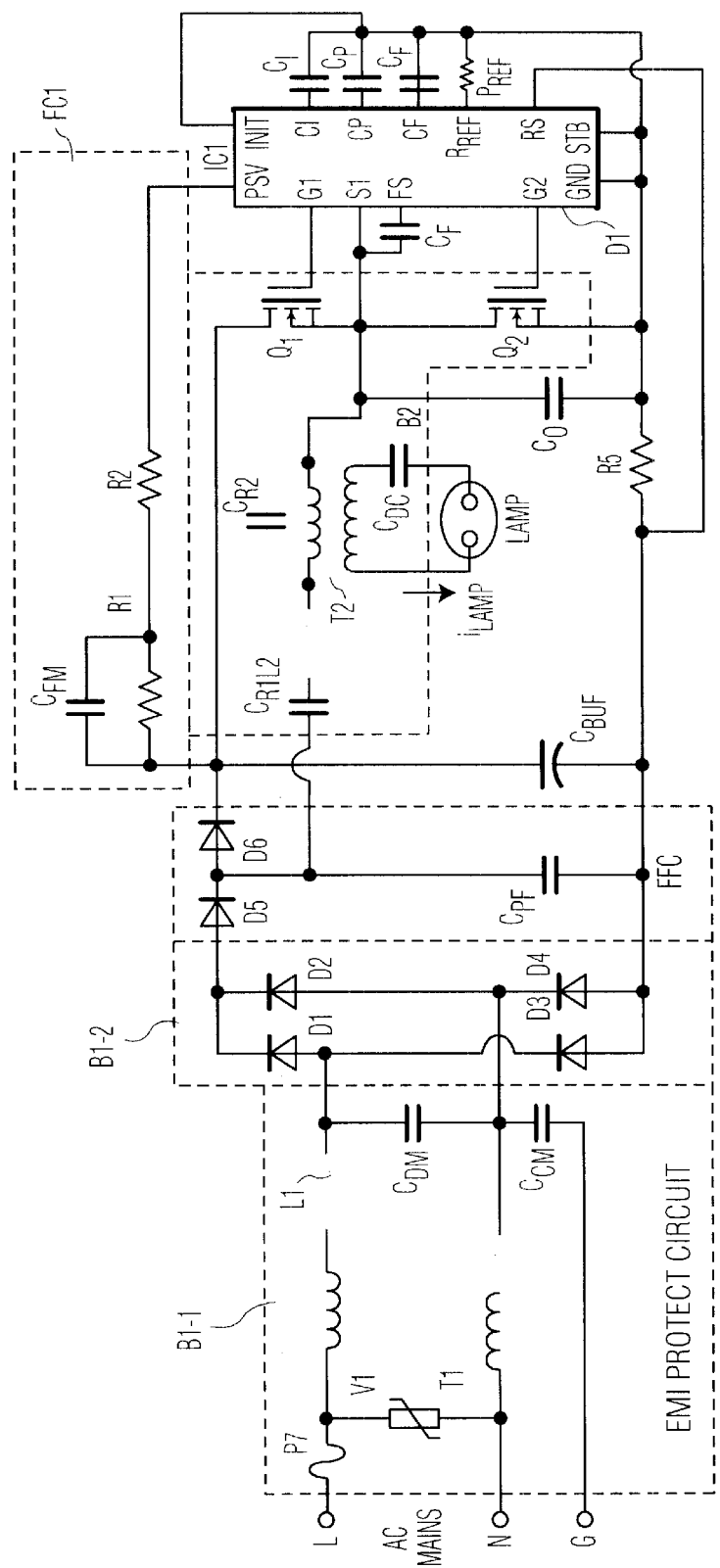
FIG. 3 is a detailed circuit diagram of a specific embodiment of the circuit for optimally generating FM for HF operation of HID lamps of FIG. 2A.

FIG. 3 shows a more detailed version of the first embodiment of a ballast circuit for optimizing frequency modulation (FM) for high frequency (HF) operation of an HID, depicted broadly in FIG. 2A, and constructed in accordance with the inventive principles disclosed herein.

From left to right in FIG. 3, AC power (AC main) is provided at the L, N and G terminals of the inventive ballast circuit of this invention. The AC is first filtered by EMI protect circuit B1-1. EMI protect circuit B1-1 includes a fuse F1 attached to a cathode end of varistor V1 and a first end of a primary of common mode filter choke transformer T1. An anode end of varistor V1 is connected to a first end of a secondary of filter choke transformer T1 and terminal N. The second end of the T1 primary is connected to a first end of differential mode filter inductor L1. The second end of differential mode filter inductor L1 is connected to full wave rectifier circuit, B1-2, and the top of a differential mode capacitor $C_{DM}$. The second end of capacitor $C_{DM}$ is connected to the top of a common mode capacitor $C_{CM}$, a second side of which is connected to terminal G.

Full-wave rectifier B1-2 connects to the first end of capacitor $C_{DM}$ to a cathode end of diode D1 and a cathode end of diode D3. The first end of capacitor $C_{CM}$ and the second end of capacitor $C_{DM}$ are connected to an anode end of diode D4 and a cathode end of diode D2. The anode ends of diodes D1 and D2 are connected to a cathode end of diode D5 of the PFC section. An anode end of diode D5 is connected to a cathode end of diode D6, the top of capacitor $C_{PF}$, and a capacitor $C_{R1}$ of the HF inverter and ballasting element B2. An anode end of diode D6 is connected to a parallel combination of capacitor $C_{FM}$ and R1, which in turn is connected serially with a resistor R2, to a source end of transistor Q1 and a first end of capacitor $C_{BUF}$. A second end of capacitor $C_{BUF}$ is connected to cathodes of diodes D3 and D4 to a first end of a resistor Rs, and directly to driver D1.

A second end of resistor R2 of the frequency control section, a gate of transistor Q1, a drain of transistor Q1, a gate of transistor Q2 and a drain of transistor Q2 are also connected to D1. A second end of capacitor $C_{R1}$ is connected to a first end of inductor L2, a second end of which is connected to a parallel combination of a first end of capacitor $C_{R2}$ and a primary of a transformer T2. A secondary of transformer T2 is connected to lamp L1 through a capacitor $C_{DC}$. A second end of capacitor $C_{R2}$ and a second end of a primary of transformer T2 are connected to a first end of a capacitor $C_O$, to the drain and source of transistors Q1 and Q2, respectively, and to a first end of a capacitor $C_F$ and an input to driver D1.

During operation, AC is converted to DC by the AC-to-DC block, and the HF inverter and ballasting element generates an average power signal (at an average frequency) to drive the lamp. Of course to avoid acoustic resonance, the average frequency must be constantly varied to prevent the lamp from being driven at a fixed frequency (e.g., high frequency) for any length of time, which could result in acoustic resonance. Instead of utilizing a separate circuit to generate a sawtooth-like signal to frequency modulate the average lamp power signal, the buffer capacitor captures the AC ripple riding on DC after conversion in the full wave rectifier in AC-to-DC block B1, filters it and provides the filtered version of the signal into a VCO contained within the driver circuit. In a preferred form, the driver may embody a high voltage driver for CFL, L6567 provided by ST Microelectronics of Italy. The ripple signal causes the square wave signal output from the HF inverter and ballasting element (an average power rating of 39 Watts and average frequency of around 80 kHz) to be swept in frequency over a range from about 75 to about 85 kHz. Please note that the embodiment depicted is for exemplary purposes only and is not meant to limit the scope of protection claimed herein.

In addition to the ballast circuit described, the invention may embody a method of utilizing a sawtooth-like signal derived from inherent AC ripple riding on DC output from an AC-to-DC converter to control frequency modulation of lamp power signal generated to power the lamp.

Those skilled in the art will recognize that the method and apparatus of the present invention has many applications, and that the present invention is not limited to the representative example(s) disclosed herein. Moreover, the scope of the present invention covers conventionally known variations and modifications to system or circuit components described herein, as would be known by those skilled in the art.

What is claimed is:

1. A ballast circuit for stable operation of a high intensity discharge (HID) lamp, comprising:
    an AC-to-DC converter to convert power from an AC source to DC, the AC-to-DC converter including a buffer capacitor to capture AC ripple riding on the DC;
    a high frequency inverter and ballasting element (HFIBE) coupled to the AC-to-DC converter and to the HID lamp the HFIBE including a generating unit to generate a lamp driving signal from the DC power drive to said HID lamp;
    a driver circuit coupled to the HFIBE, the driver circuit including a voltage controlled oscillator (VCO) to generate a driving signal to drive the HFIBE; and
    a frequency control circuit coupled to the buffer capacitor, the HFIBE and the driver circuit, wherein the buffer capacitor provides a control signal to the driver circuit, and wherein the VCO in the driver circuit responds to the control signal by controlling the HFIBE to output a frequency swept square wave signal to power said HID lamp without driving said lamp into an acoustic resonant state.

2. The ballast circuit as set forth in claim 1, further comprising:
    a power correction circuit between the AC-to-DC converter and the HFIBE.

3. The ballast circuit as set forth in claim 1, wherein the frequency control circuit is an RC circuit.

4. The ballast circuit as set forth in claim 1, wherein the frequency control circuit is constructed as part of an integrated circuit.

5. The ballast circuit as set forth in claim 3, wherein the frequency control circuit senses a voltage on the buffer capacitor and generates a current which varies in frequency with variance of the voltage in the buffer capacitor.

6. The ballast circuit as set forth in claim 3, wherein the frequency control circuit includes a buffer capacitor of approximately 22 nanofarads.

7. The ballast circuit as set forth in claim 1, wherein said lamp is a metal halide lamp.

8. The ballast circuit as set forth in claim 1, wherein an average lamp power signal generated in the HFIBE includes a frequency of around 80 kHz and a power rating of approximately 39 Watts.

9. The ballast circuit as set forth in claim 8, wherein the swept frequency signal out from the HFIBE to the lamp runs from about 75 to about 85 kHz.

10. The ballast circuit as set forth in claim 1, wherein the frequency control circuit includes a capacitor and a first resistor connected in parallel, the parallel combination connected serially to a second resistor.

11. The ballast circuit as set forth in claim 10, where the capacitor is around 22 nanofarads and the first and second resistors are about 158 kOhms and 169 kOhms, respectively.

12. The ballast circuit as set forth in claim 1, wherein the AC-to-DC converter includes a full-wave rectifier.

13. The ballast circuit as set forth in claim 1, wherein the AC-to-DC converter includes an EMI protect circuit.

14. A high intensity discharge lamp for stable operation including a very low cost (VLC) ballast circuit which captures a sawtooth-like AC ripple signal in a buffer capacitor to produce a control signal to frequency modulate an average lamp power signal used to drive the lamp outside a state of acoustic resonance, the ballast circuit comprising:
    an AC-to-DC converter to connect to an AC power source, the AC-to-DC converter including a buffer capacitor;
    a high frequency inverter and ballasting element coupled to the AC-to-DC converter and the buffer capacitor to generate a square wave signal to drive said HID lamp; and
    a coupling circuit to couple a control signal generated by the buffer capacitor into a driver,
    wherein a VCO within the driver responds to the control signal to generate a swept frequency modulating signal causing the high frequency inverter and ballasting element to drive the HID lamp to maintain a stable state.

15. A low cost method of operating a high intensity discharge (HID) lamp having a ballast circuit, the method comprising:

generating DC in an AC/DC converter;

capturing any AC ripple of the DC with a buffer capacitor to generate a control signal;

generating a high frequency lamp power signal from the DC utilizing an high frequency inverter circuit; and modulating the high frequency lamp power signal utilizing the control signal to generate a frequency swept lamp power signal to drive said lamp while avoiding acoustic resonance.

16. The method as set forth in claim 15, wherein the frequency modulated signal has a range from about 75 to about 85 kHz to operate the HID lamp without going into acoustic resonance.

17. The method as set forth in claim 15, wherein the control signal has a frequency range of around 10 to 1000 Hz.

* * * * *